(12) United States Patent
Brech et al.

(10) Patent No.: US 9,851,933 B2
(45) Date of Patent: Dec. 26, 2017

(54) CAPABILITY-BASED ABSTRACTION OF SOFTWARE-DEFINED INFRASTRUCTURE

(71) Applicant: International Business Machines Corporation, Armonk, NY (US)

(72) Inventors: Brad L. Brech, Rochester, MN (US); Scott W. Crowder, Pleasantville, NY (US); Hubertus Franke, Cortlandt Manor, NY (US); Jeffrey A. Frey, New Paltz, NY (US); Nagui Halim, Yorktown Heights, NY (US); Matt R. Hogstrom, Raleigh, NC (US); Yu-Cheng Hsu, Tucson, AZ (US); Dilip D. Kandlur, San Jose, CA (US); Chung-Sheng Li, Scarsdale, NY (US); David B. Lindquist, Chapel Hill, NC (US); Stefan Pappe, Heidelberg (DE); Pratap C. Pattnaik, Ossining, NY (US); Balachandar Rajaraman, Cary, NC (US); Radha P. Ratnaparkhi, Ridgefield, CT (US); Renato J. Recio, Austin, TX (US); Rodney A. Smith, Atlanta, GA (US); Michael D. Williams, Gardiner, NY (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 14/667,740

(22) Filed: Mar. 25, 2015

(65) Prior Publication Data
US 2016/0285966 A1    Sep. 29, 2016

(51) Int. Cl.
G06F 3/12 (2006.01)
H04L 12/24 (2006.01)

(52) U.S. Cl.
CPC .......... G06F 3/126 (2013.01); H04L 41/0893 (2013.01); G06F 3/1288 (2013.01); H04L 41/5096 (2013.01)

(58) Field of Classification Search
CPC .................................................. H04L 67/1008
See application file for complete search history.

(56) References Cited

U.S. PATENT DOCUMENTS 7,904,909 B1    3/2011    Reiner et al.
8,200,789 B2    6/2012    Boutboul et al.
(Continued)

FOREIGN PATENT DOCUMENTS

KR    1020090063122 A    6/2009

OTHER PUBLICATIONS

Li, C-S., et al. "Software defined environments: An introduction." IBM Journal of Research and Development 58.2/3 (2014): 1-1.*
(Continued)

Primary Examiner — Jimmy H Tran
(74) Attorney, Agent, or Firm — Stephen R. Yoder

(57) ABSTRACT

There is a method and system for capability-based resource allocation in a software-defined environment that performs the following steps (not necessarily in the following order): (i) determining a set of capability characteristics for a plurality of workload resources within a software-defined environment; (ii) determining a set of workload components for a specified workload; and (iii) identifying a set of workload resources from the plurality of workload resources to allocate to the specified workload based, at least in part, on the set of capability characteristics corresponding to each workload within the set of workload resources. A workload component of the set of workload components has a unique set of workload characteristics.

18 Claims, 6 Drawing Sheets

(56) References Cited

U.S. PATENT DOCUMENTS

| | | | |
|---|---|---|---|
| 8,352,952 B2 | 1/2013 | Hanquez et al. | |
| 8,427,668 B2* | 4/2013 | Markel | G06F 9/5027 |
| | | | 358/1.1 |
| 8,582,155 B2* | 11/2013 | Jarvis | G06F 3/1204 |
| | | | 358/1.15 |
| 8,661,120 B2* | 2/2014 | Atchison | G06F 9/5072 |
| | | | 709/217 |
| 8,792,114 B2* | 7/2014 | Stewart | H04L 29/08846 |
| | | | 358/1.13 |
| 8,904,003 B2* | 12/2014 | Wookey | G06F 9/5055 |
| | | | 709/203 |
| 9,195,484 B1* | 11/2015 | Ward, Jr. | G06F 9/455 |
| 9,235,441 B2* | 1/2016 | Brech | G06F 9/4893 |
| 9,413,819 B1* | 8/2016 | Berg | H04L 67/10 |
| 9,448,824 B1* | 9/2016 | Fitzgerald | G06F 9/45533 |
| 2008/0155100 A1 | 6/2008 | Ahmed et al. | |
| 2010/0050172 A1 | 2/2010 | Ferris | |
| 2010/0250748 A1* | 9/2010 | Sivasubramanian | G06F 9/5016 |
| | | | 709/226 |
| 2011/0173303 A1 | 7/2011 | Rider | |
| 2012/0173708 A1 | 7/2012 | Bartfai-Walcott et al. | |
| 2012/0204169 A1* | 8/2012 | Breiter | G06F 9/5072 |
| | | | 717/171 |
| 2013/0060928 A1* | 3/2013 | Shao | G06F 9/5072 |
| | | | 709/223 |
| 2013/0138806 A1 | 5/2013 | Gohad et al. | |
| 2013/0138854 A1 | 5/2013 | Bandholz et al. | |
| 2013/0179895 A1* | 7/2013 | Calder | G06F 9/5077 |
| | | | 718/104 |
| 2013/0185667 A1 | 7/2013 | Harper et al. | |
| 2013/0205028 A1 | 8/2013 | Crockett et al. | |
| 2014/0058871 A1* | 2/2014 | Marr | G06F 9/45533 |
| | | | 705/26.1 |
| 2014/0258374 A1* | 9/2014 | Suryanarayanan | H04L 67/101 |
| | | | 709/203 |
| 2015/0026348 A1* | 1/2015 | Siddiqui | G06F 9/46 |
| | | | 709/226 |
| 2015/0067783 A1* | 3/2015 | Pulier | G06F 9/45558 |
| | | | 726/3 |
| 2015/0363723 A1* | 12/2015 | Zeng | G06Q 10/06 |
| | | | 705/7.23 |

OTHER PUBLICATIONS

Kandiraju, G., et al. "Software defined infrastructures." IBM Journal of Research and Development 58.2/3 (2014): 2-1.*

Dixon, Colin, et al. "Software defined networking to support the software defined environment." IBM Journal of Research and Development 58.2/3 (2014): 3-1.*

Dan et al., "Connecting Client Objectives with Resource Capabilities: An Essential Component for Grid Service Management Infrastructures", Proceedings of the 2nd International Conference on Service Oriented Computing (ICSOC'04), ACM, New York, NY, USA, 2004, pp. 1-8, DOI 10.1145/1035167.1035177.

Luckow et al., "SAGA BigJob: An Extensible and Interoperable Pilot-Job Abstraction for Distributed Applications and Systems", 2010 10th IEEE/ACM International Conference on Cluster, Cloud and Grid Computing (CCGrid), May 17-20, 2010, pp. 135-144, DOI 10.1109/CCGRID.2010.91.

Ringwald et al.; "Architecture hybride : optimiser la localisation de vos applications ( Fit for Purpose )" UDM 2012 L'Universite du Mainframe et des Systemes Hybrides; 15 et 16 mars—IBM Forum Paris.

Sarathy et al., "Next generation Cloud Computing Architecture: Enabling real-time dynamism for shared distributed physical infrastructure", 2010 19th IEEE International Workshop on Enabling Technologies: Infrastructures for Collaborative Enterprises (WETICE), Jun. 28-30, 2010, pp. 48-53, DOI 10.1109/WETICE.2010.14.

* cited by examiner

CAPABILITY-BASED ABSTRACTION OF SOFTWARE-DEFINED INFRASTRUCTURE

BACKGROUND OF THE INVENTION

The present invention relates generally to the field of virtualization in cloud computing, and more particularly to workload management.

Current virtualization and cloud solution allow abstraction of the computing, storage, and network resources in terms of their capacity through standardization of the underlying system architecture to simplify the abstraction of these resources. On the other hand, the workload-optimized system approach relies on tight integration of the workload (including compiler) to the underlying system architecture. This approach allows direct leverage of the special capabilities offered by each micro-architecture and by the system level capabilities at the expense of required labor-intensive optimization and tuning.

A framework, referred to herein as the "Pfister framework," has been used to describe workload characteristics of a given application. The Pfister framework considers "thread contention" versus "data contention." With that in mind, four workload categories are defined: (i) mixed workload updating shared data or queues (such as enterprise software, also known as application and integration middleware); (ii) highly threaded applications; (iii) parallel data structures with analytics (such as frameworks for storage and large-scale processing of data sets on cluster computing environments); and (iv) small discrete applications.

SUMMARY

According to a first aspect of the present invention, there is a method for capability-based resource allocation in a software-defined environment that includes determining a set of capability characteristics for a plurality of workload resources within a software-defined environment, determining a set of workload components for a specified workload, and identifying a set of workload resources from the plurality of workload resources to allocate to the specified workload based, at least in part, on the set of capability characteristics corresponding to each workload within the set of workload resources. A workload component of the set of workload components has a unique set of workload characteristics. At least the identifying step is performed by computer software running on computer hardware.

According to a second aspect of the present invention, there is a computer program product for capability-based resource allocation in a software-defined environment, the computer program product includes a computer readable storage medium having stored thereon program instructions programmed to determine a set of capability characteristics for a plurality of workload resources within a software-defined environment, to determine a set of workload components for a specified workload, and identify a set of workload resources from the plurality of workload resources to allocate to the specified workload based, at least in part, on the set of capability characteristics corresponding to each workload within the set of workload resources. A workload component of the set of workload components has a unique set of workload characteristics.

According to a third aspect of the present invention, there is a computer system for capability-based resource allocation in a software-defined environment, the computer system including a processor(s) set, and a computer readable storage medium. The processor set is structured, located, connected, and/or programmed to run program instructions stored on the computer readable storage medium and the program instructions include program instructions programmed to determine a set of capability characteristics for a plurality of workload resources within a software-defined environment, determine a set of workload components for a specified workload, and identify a set of workload resources from the plurality of workload resources to allocate to the specified workload based, at least in part, on the set of capability characteristics corresponding to each workload within the set of workload resources. A workload component of the set of workload components has a unique set of workload characteristics.

DETAILED DESCRIPTION

Figure 1:
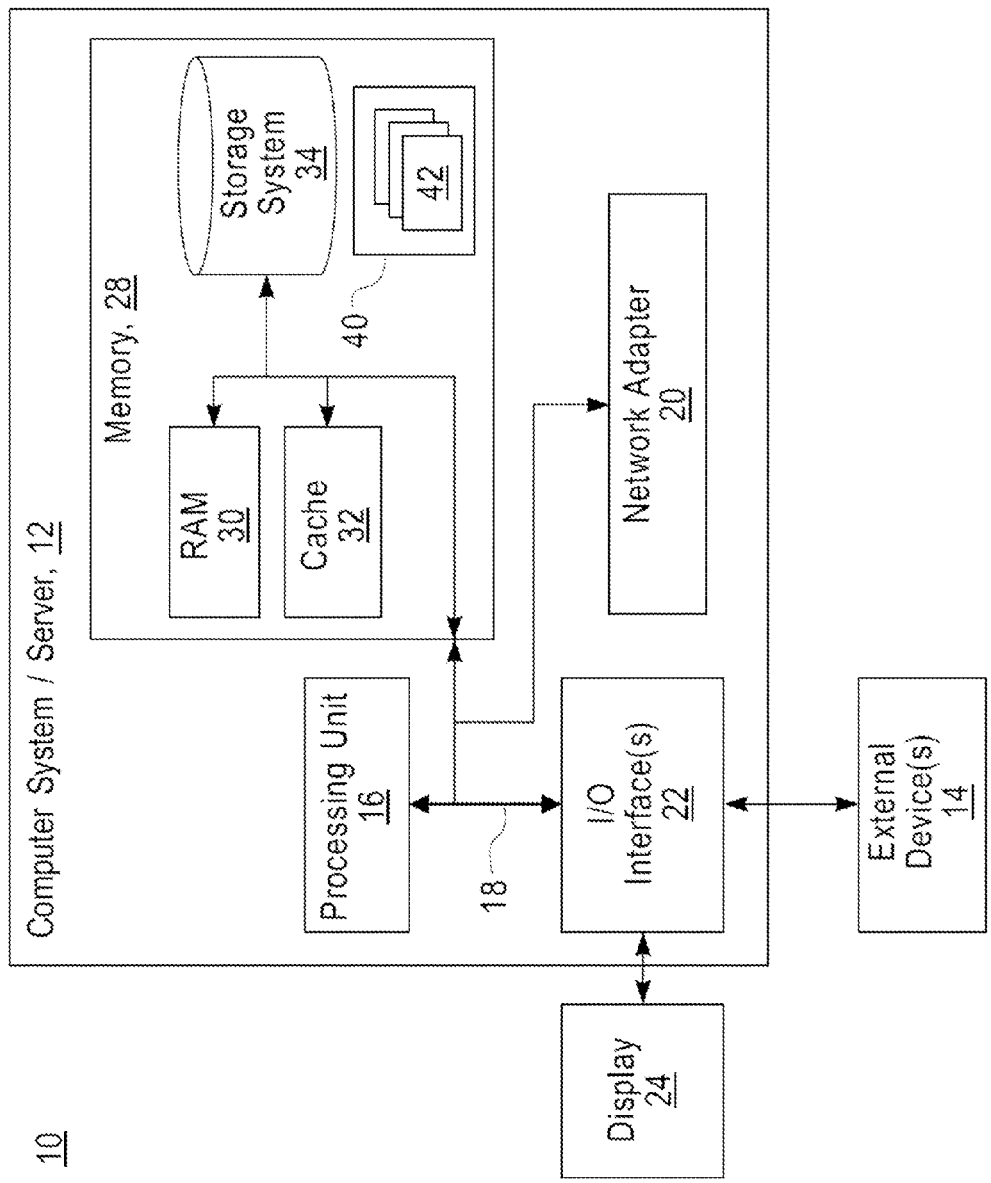
FIG. 1 depicts a cloud computing node used in a first embodiment of a system according to the present invention.

Computing resources are characterized according to their capability to develop capability-based resource abstractions. Resource abstractions are assigned to a specified workload according to workload requirements. The present invention is a system, a method, and/or a computer program product. The computer program product includes a computer readable storage medium (or media) having computer readable program instructions thereon for causing a processor to carry out aspects of the present invention.

The computer readable storage medium is a tangible device that retains and/or stores instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein are, according to some embodiments, downloaded to respective computing/processing devices from a computer readable storage medium or to an external computer or external storage device via a network, for example, the Internet, a local area network, a wide area network and/or a wireless network. The network comprises copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, are implemented by computer readable program instructions.

The computer readable program instructions are, according to some embodiments of the present invention, provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The computer readable program instructions may also be stored in a computer readable storage medium that directs a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions are, according to some embodiments of the present invention, loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams represents a module, segment, or portion of instructions, which comprises one or more executable instructions for implementing the specified logical function(s). In some alternative implementations, the functions noted in the block occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, are, in some embodiments, implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that are rapidly provisioned and released with minimal management effort or interaction with a provider of the service. For some embodiments of the present invention, this cloud model includes at least five characteristics, at least three service models, and at least four deployment models.

Characteristics are as Follows:

On-demand self-service: a cloud consumer unilaterally provisions computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities are rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage is monitored, controlled, and/or reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which includes, in some embodiments, operating systems and/or applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It is managed by the organization or a third party and exists either on-premises or off-premises.

Community cloud: the cloud infrastructure is shared by several organizations and supports a specific community that has shared concerns (e.g., mission, security requirements, policy, and compliance considerations). It is managed by the organizations or a third party and exists either on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities, but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that are suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules include routines, programs, objects, components, logic, data structures, and so on that perform particular tasks or implement particular abstract data types. Computer system/server 12, according to some embodiments of the present invention, are practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 includes computer system readable media in the form of volatile memory, such as random access memory (RAM) 30 and/or cache memory 32. Computer system/server 12 further includes, in some embodiments, other removable/non-removable, volatile/non-volatile computer system storage media. By way of example only, storage system 34 is provided for reading from and writing to a non-removable, non-volatile magnetic media (not shown and typically called a "hard drive"). By further example, and although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media are provided. In such instances, each can be connected to bus 18 by one or more data media interfaces. As will be further depicted and described below, memory 28 includes, in some embodiments, at least one program product having a set (e.g., at least one) of program modules that are configured to carry out the functions of embodiments of the invention.

Program/utility 40, having a set (at least one) of program modules 42, is stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 also, according to some embodiments of the present invention, communicates with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication occurs, in some embodiments, via Input/Output (I/O) interfaces 22. Still yet, computer system/server 12 communicates, in some embodiments, with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
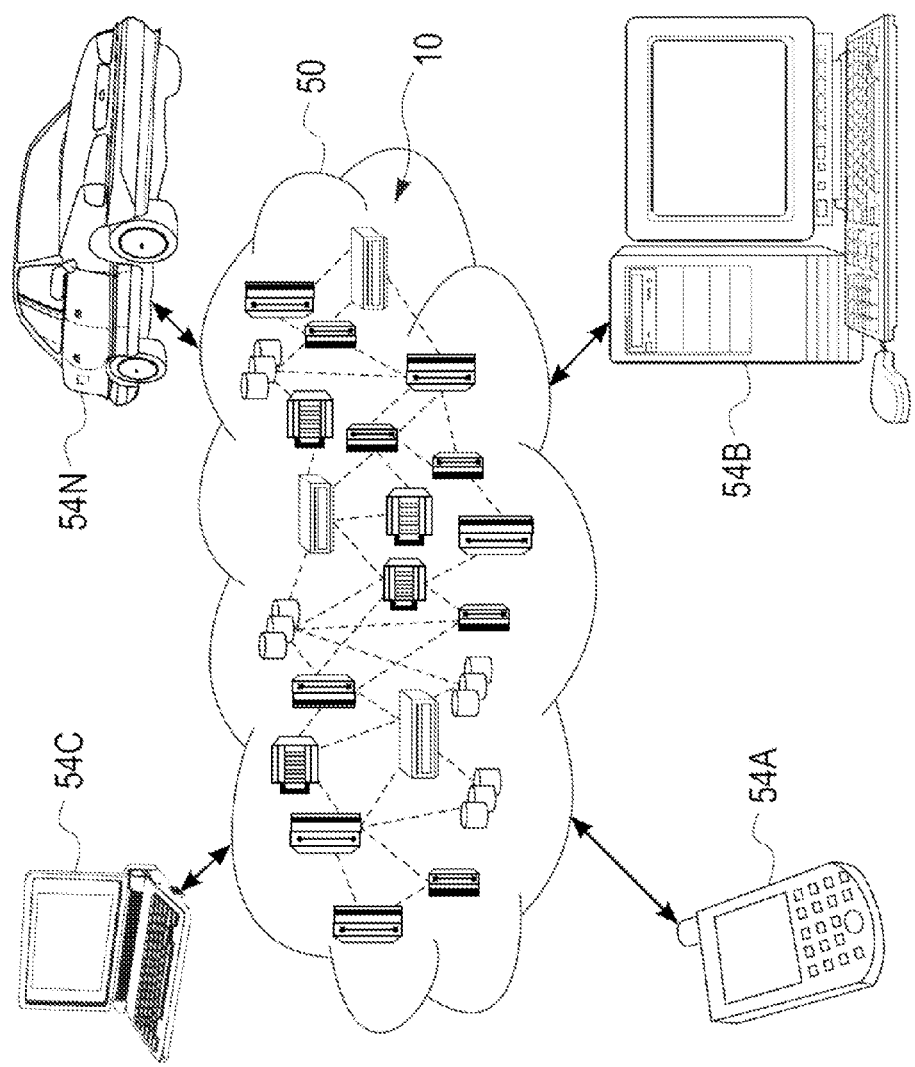
FIG. 2 depicts an embodiment of a cloud computing environment (also called the "first embodiment system") according to the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They are grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 communicate with any type of computerized device over any type of network and/or network addressable connection (e.g., using a web browser).

Figure 3:
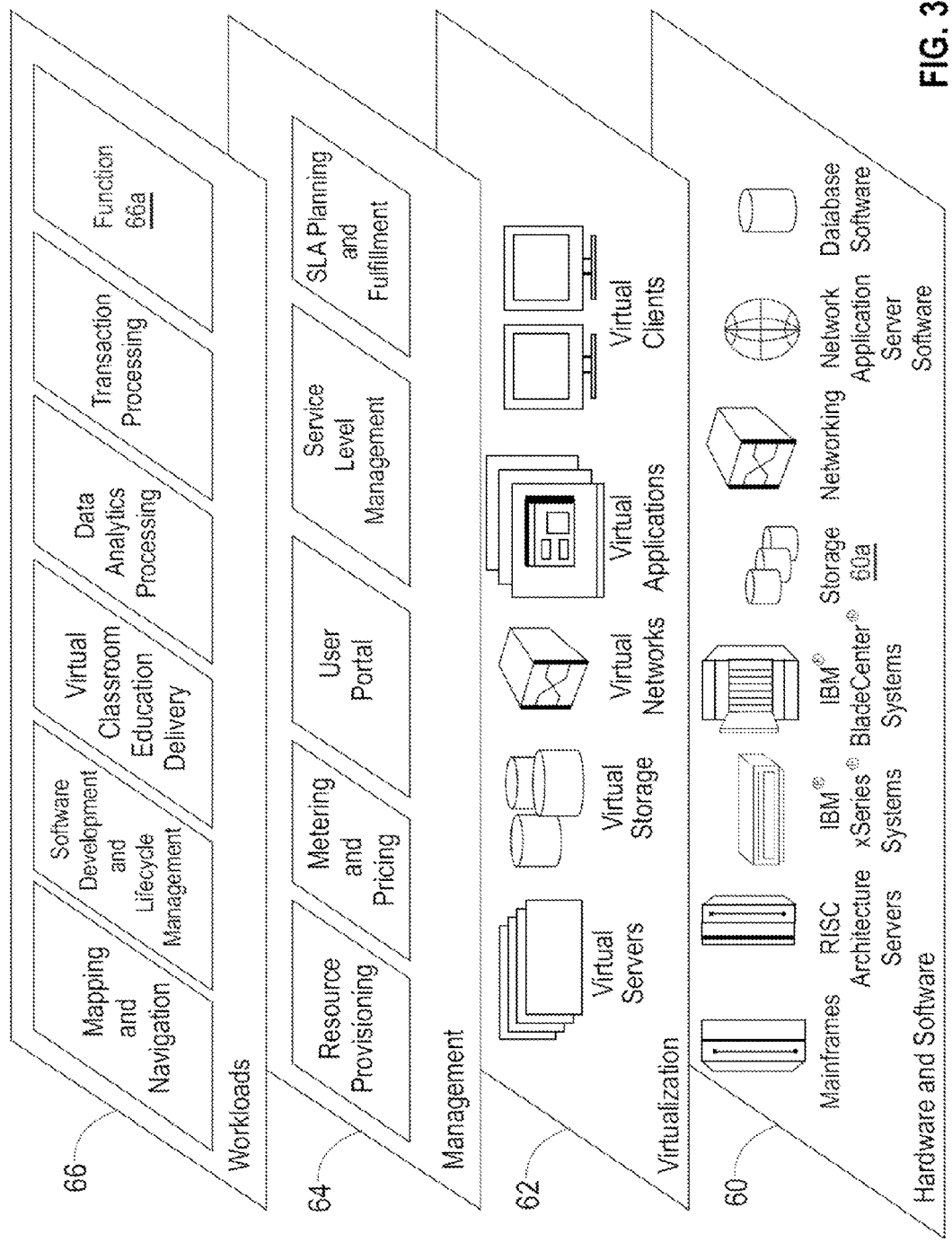
FIG. 3 depicts abstraction model layers used in the first embodiment system.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices 60a; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities are provided: virtual servers; virtual storage; virtual networks, including virtual private networks; virtual applications and operating systems; and virtual clients.

In one example, management layer 64 provides the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources comprise application software licenses. Security (not shown) provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment is utilized. Examples of workloads and functions which are provided from this layer include: mapping and navigation; software development and lifecycle management; virtual classroom education delivery; data analytics processing; transaction processing; and functionality, according to the present invention (see function block 66a) as will be discussed in detail, below.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Figure 4:
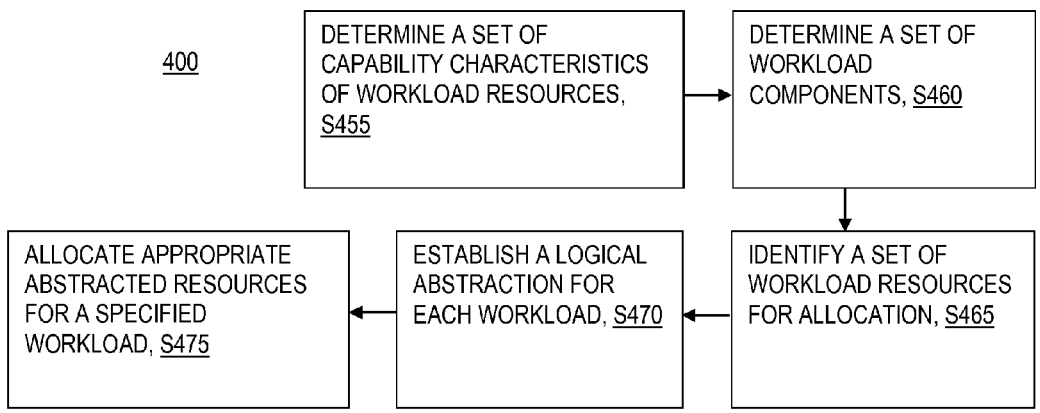
FIG. 4 is a flowchart showing a first embodiment method performed, at least in part, by the first embodiment system.
Figure 5:
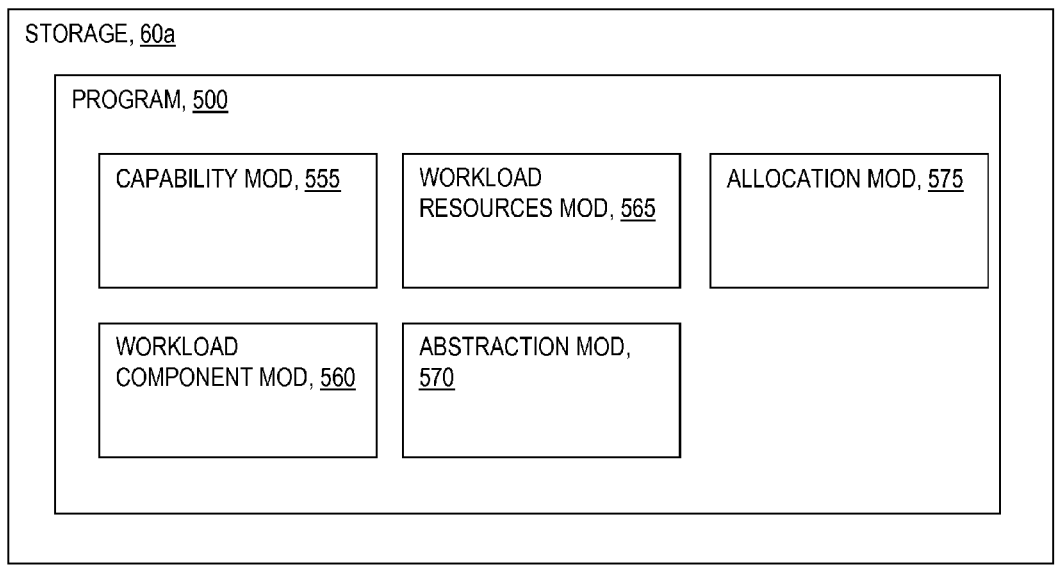
FIG. 5 is a block diagram of a machine logic (for example, software) portion of the first embodiment system.

FIG. 4 shows flowchart 400 depicting a method according to the present invention. FIG. 5 shows program 500 for performing at least some of the method steps of flowchart 400. This method and associated software will now be discussed, over the course of the following paragraphs, with extensive reference to FIG. 4 (for the method step blocks) and FIG. 5 (for the software blocks). As shown in FIG. 5, one exemplary physical location where program 500 is stored is in storage block 60a (see FIG. 3).

Processing begins at step S455, where capability module ("mod") 555 determines a set of capability characteristics for various workload resources. In a cloud environment, workload resources are located within a single data center or located in two or more data centers. Each workload resource used for performing a particular workload type, or workload component, is designated for use according to its capability profile. The capability profile is the set of capability characteristics for a given resource. In this embodiment, workload resource capabilities are identified from a reference set of pre-determined capability characteristics. Alternatively, a user inputs resource characteristics according to individual preference and/or personal reference material.

Processing proceeds to step S460, where workload component mod 560 determines a set of workload components for a specified workload. A simple example follows to illustrate aspects of some embodiments of the present invention. A workload is, for example, a print job that includes photos, text, and graphs. In this example, the workload is divided into three jobs, or components: (i) color photo printing; (ii) black and white text printing; and (iii) color graph printing.

Processing proceeds to step S465, where workload resources mod 565 identifies a set of workload resource(s) to process a workload in a cloud environment. Capability-based resource assignment identifies resources capable of completing any of the workload components properly. Continuing with the above example, process time must be minimized, so capability characteristics for this example workload include: (i) speed; (ii) color imaging; (iii) text sharpness; and (iv) line resolution. In this step, workload resources mod 560 identifies resources based on their respective capability profiles determined in step S455.

Processing proceeds to step S470, where abstraction mod 570 establishes a logical abstraction for each workload resource of the set of workload resource(s) identified in step S465. The logical abstraction, as discussed in more detail below, enables the equivalent of instruction set architecture (ISA) at the data center and/or multi-data center level(s). For this disclosure, the abstraction of resources is based on the various capabilities of the set of workload resource(s).

Processing ends at step S475, where allocation mod 575 allocates appropriate abstracted resources for a specified workload. Having established logical abstractions for the required workload resources in step S470, some embodiments of the present invention assign those abstracted resources to corresponding workload components. Continuing with the above example, those abstracted resources having superior capability profiles for one, or more, of the key characteristics including speed, color imaging, text sharpness, and line resolution are deployed to process the specified workload.

Some embodiments of the present invention recognize the following facts, potential problems, and/or potential areas for improvement with respect to the current state of the art: (i) the convenience offered by the elasticity of conventional virtualization and cloud solutions for scaling the provisioned resources based on the workload requirements is often achieved at the expense of overlooking capability differences in the resources, whether inherent or otherwise; (ii) conventional workload-optimized systems are not easily sustainable in an environment where the type of workload might be unpredictable or evolve rapidly; (iii) the conundrum created by the conflicting requirements of agility and efficiency are further exacerbated by the fact that increasingly more applications (from systems of records and systems of engagement) desire agility (fast deployment of application, easily scaling of resources) and efficiency (workload optimized based on the resource) at the same time; (iv) resource provisioning is only based on capacity, and, therefore, the differences in characteristics of the resource are often ignored; (v) servers and other computer systems are not optimized for each of the four workload categories of the Pfister framework, that is, essentially, no computer system is optimized for all types of workloads; (vi) workloads (whether systems of record or systems of engagement or a combination of the two) oftentimes include multiple workload types that are best addressed by a combination of heterogeneous servers rather than a set of homogeneous servers; (vii) heterogeneous architectures introduce different functional (e.g. instruction set architecture, cache, and accelerators) and non-functional characteristics (e.g. resilience, security, and performance) at the system levels, leading to complicated system design; (viii) performance optimization through leveraging available capabilities within the heterogeneous architecture cannot always be contained by existing programming model, impacting agility to affect the application and end users; and/or (ix) agility also compromises quality.

Capability differences in the computing domain include: (i) instruction set architecture (ISA) (e.g x86, POWER, SPARC, and ARM); (ii) implementations of the same ISA (e.g. Xeon by Intel, and Opteron by AMD); (iii) generation of the same ISA by the same vendor (e.g. P7, P7+, P8 from IBM, Nehalem from Intel, Westmere from Intel, and Sandy Bridge from Intel; (iv) implementation with or without a graphics processing unit (GPU); and/or (v) with or without other accelerators (for cryptography, extensible markup language (XML), and/or other scalar/vector functions). (Note: the term(s) "x86," "POWER," "SPARC," "ARM," "Xeon," "Intel," "Opteron," "AMD," "P7," "P7+," "P8," "IBM," "Nehalem," "Westmere," and/or "Sandy Bridge" may be subject to trademark rights in various jurisdictions throughout the world and are used here only in reference to the products or services properly denominated by the marks to the extent that such trademark rights may exist.)

Figure 6:
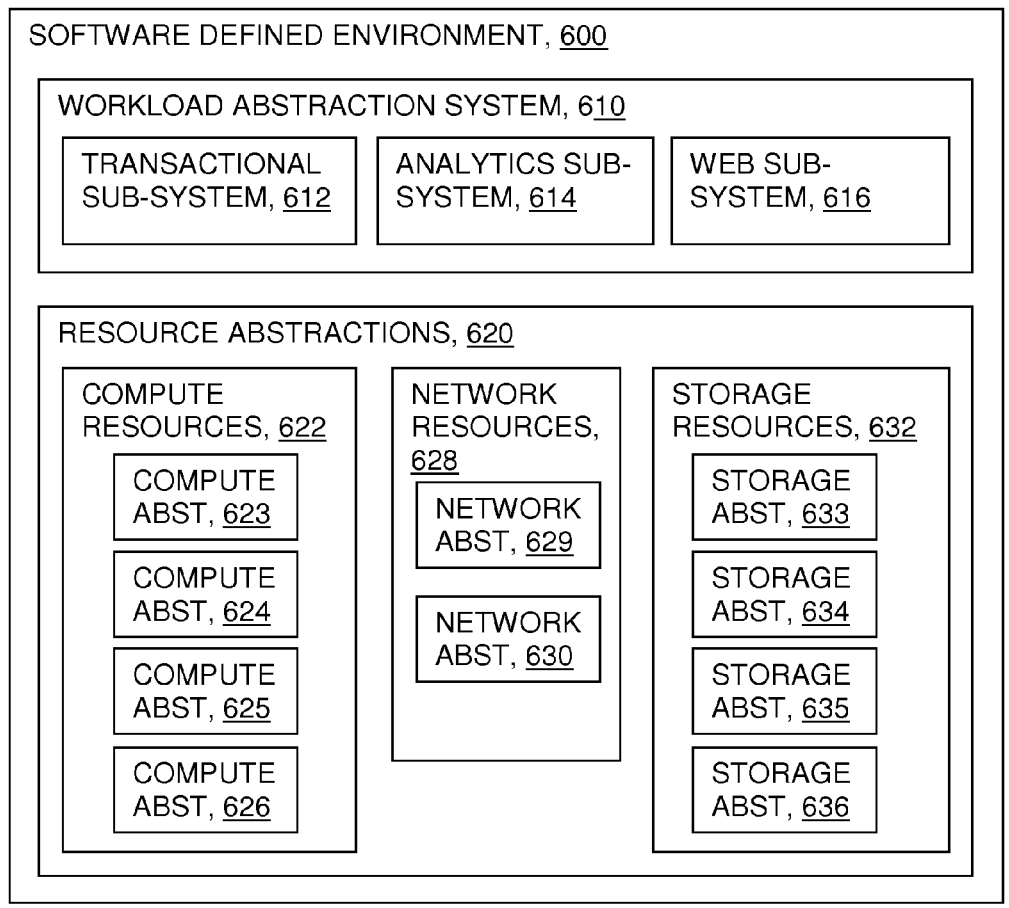
FIG. 6 is a block diagram of a software defined environment according to the present invention.
Figure 7:
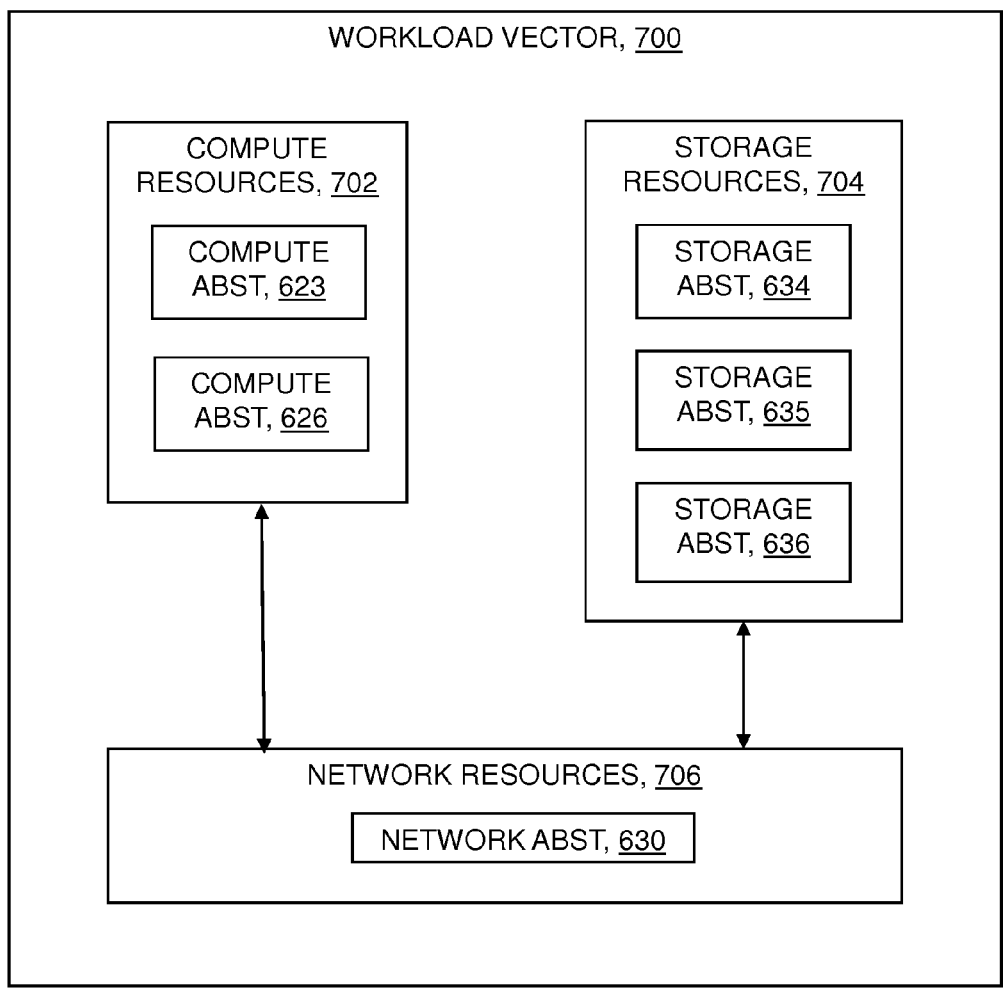
FIG. 7 is a block diagram of a workload vector according to the present invention.

FIG. 6 is a diagram illustrating the components of software defined environment (SDE) 600 according to an embodiment of the present invention. SDE 600 includes: workload abstraction system 610; transactional abstraction sub-system (such as J2EE, OLTP) 612; analytics abstraction sub-system (including, for example, Map and Reduce functionality) 614; web abstraction sub-system (e.g. web 2.0 pattern) 616; resource abstractions 620; compute resources (e.g. Power VM, x86 KVM) 622; compute abstractions 623, 624, 625, 626; network resources (e.g. RDMA, Ethernet) 628; network abstractions 629, 630; storage resources (e.g. SSD, HDD, tape) 632; and storage abstractions 633, 634, 635, 636. FIG. 7 is a diagram illustrating the components of workload vector 700, including: software-defined compute resources 702; software-defined storage resources 704; and software-defined network resources 706. The workload vector draws from SDE 600 for required resources including: compute abstractions 623 and 626; storage abstractions 634, 635, and 636; and network abstraction 630.

While software defined environments, such as SDE 600, originated from the compute environment, such as compute resources 622, where the computing resources are virtualized and managed as virtual machines, software defined networks (SDN), such as network resources 628, move the network control plane away from the switch to the software running on a server for improved programmability, efficiency, and extensibility. Software defined network resources 628 include, according to various embodiments of the present invention, the following resource abstractions: (i) security; (ii) tenant and port isolation; (iii) firewall; (iv) load balancer; (v) monitoring; (vi) WAN optimization; (vii) quality of service; (viii) L2/L3 routing; (ix) load balancer; and/or (x) deep introspection.

The software defined storage (SDS), such as storage resources 632, separates the control plane from the data plane of a storage and dynamically leverages heterogeneity of storage to respond to changing workload demands. SDS includes, according to some embodiments of the present invention, the following resources: (i) file storage; and/or (ii) block storage. The software defined compute (SDC), such as compute resources 622, includes, according to some embodiments of the present invention, the following resources: (i) high memory BW nodes; (ii) high single thread performance nodes; (iii) high thread count nodes; and/or (iv) micro server nodes.

SDE 600 brings together software defined compute 622, software defined network 628, and software defined storage 632 to unify the control planes from each individual software defined component. The unified control planes allow rich resource abstractions to enable assembling purpose fit systems and/or providing programmable infrastructures to enable dynamic optimization in response to business requirements. The key elements within SDE 600 includes: (i) capability-based resource abstraction; (ii) policy-based workload abstraction; and/or (iii) outcome-based continuous mapping of the workload to the resources.

Some embodiments of the present invention provide for both agility and efficiency in applications, such as systems of records and systems of engagement, by implementing process steps including: (i) establish logical abstraction of the software defined infrastructure (that includes compute, storage, and network) for the available resources in compute, storage and network across one or more data centers; (ii) capability-based pooling of heterogeneous resources require classification of these resources based on workload characteristics (referred to herein as a "workload eigenvector"); (iii) automatic resource discovery, calibration, and clustering (bootstrapping) into "workload eigenvector". In the continuous operation mode, any new resources (compute, storage, network) added to the data center will go through this process; (iv) workload component calibration and matching to the most appropriate resources (based on the matching between the workload characteristics and the capability-based resource pooling); and/or (v) continuous optimization of the mapping based on the newly available resources and potentially changing workload characteristics.

In step (1), establishing logical abstraction of the software defined infrastructure for the available resources in compute, storage, and network across one or more data centers, the available resources are potentially extended by using hybrid cloud (or cloud broker) technologies to include multiple private and public clouds. Where the available resources are extended as such, the software defined infrastructure includes pools of computing and storage resources interconnected by networking resources. This abstraction of the data center enables the equivalent of an ISA at the data center or multi-data center levels.

As stated above, machines making up the virtualized computing network are defined by capability measures. These capabilities, with respect to servers, include: (i) fitness for serial loads; (ii) fitness for parallel loads; and/or (iii) fitness for data-centric loads. Some embodiments of the present invention consider a specified workload as being made up of multiple workload types, such that one workload type is handled by one resource according to its particular capability(ies), and a second workload type is handled by a second resource according to its particular capability(ies).

Using the software-defined compute abstraction as an example, and where the server design is based on the thread speed, thread count, and effective cache/thread, the fitness of the compute resources, for example, servers, to the workload can then be measured by the following categories: (i) serial fitness (in terms of thread speed); (ii) parallel fitness (in terms of thread count), and/or (iii) data fitness (in terms of cache/thread). In this example, these categories are considered for corresponding compute resource abstractions with workload eigenvectors at the thread level.

Some embodiments of the present invention provide computing resource abstraction based on capabilities including: (i) high memory bandwidth resources; (ii) high single-thread performance resources; (iii) high input/output (I/O) throughput resources; (iv) high cache resources; (v) high thread resources; and/or (vi) resources with strong graphics capabilities. Further, some embodiments of the present invention provide storage resource abstraction based on capabilities including: (i) capacity; (ii) block; (iii) file; (iv) object; (v) I/O throughput; (vi) resiliency; and/or (vii) latency. Still further, some embodiments of the present invention provide network resource abstraction based on capabilities including: (i) resiliency; (ii) redundancy; (iii) latency; and/or (iv) bandwidth.

Some embodiments of the present invention operate in a continuous operation mode, such that new resources added to the data center (whether computing, storage, or network) are processed as described above in an automated way through a process involving discovery of the resource, calibration of the resource, and clustering, or bootstrapping, the resource into the workload eigenvector. A workload eigenvector applies to workload patterns, but also operates at the thread level, as mentioned above. For example, when a new type of equipment is added to the cloud environment, the set of representative benchmarks is determined and a record is made of how the workload component performs under varying conditions, such as for various memory sizes and/or various central processing unit (CPU) shares. In this embodiment, the individual performance measures are recorded as "discrete" instances. Alternatively, the performance measures are extrapolated into linear or non-linear functions. The observations and constraints are defined as the feature vector. Components are connected via network links that will ultimately be managed.

Network resources are handled in a way similar to the computing resources in that a set of network tests is run for considering a potential combination of virtual image placements. A link characteristic vector is created with the result for each of the potential combinations. In this example, the process is automated. Accordingly, the information is maintained in a "resource feature store". The workload resource "eigenvectors" are clustered (via unsupervised learning) using algorithms such as K-means based on the Euclidean distance among these vectors. For some embodiments of the present invention, benchmark-based calibration and clustering is performed when new resources are added to the pool, so that a sufficient and meaningful pool for each discrete "capability" is maintained.

A virtual application consists of a multitude of containers (which could be virtual images, or containers stood up on bare metal, or within a Java virtual machine (JVM) each providing a specific functionality. (Note: the term(s) "Java" and/or "JVM" may be subject to trademark rights in various jurisdictions throughout the world and are used here only in reference to the products or services properly denominated by the marks to the extent that such trademark rights may exist.) Some embodiments of the present invention perform a calibration step that attempts to capture the feature vector of the workload before it is deployed. The feature vector is not required to be fully populated. Also, it is not necessary that the feature vector be run across all platforms and all possible virtual image to physical node assignment combinations. So long as some characteristics of the execution is captured to later obtain a close match to that feature vector.

In general, a distance metric is needed to measure the distance between two "eigenvectors." A commonly used distance metric is Euclidean distance:

$$d(p, q) = d(q, p) = \sqrt{(q_1 - p_1)^2 + (q_2 - p_2)^2 + \ldots + (q_n - p_n)^2}$$
$$= \sqrt{\sum_{i=1}^{n} (q_i - p_i)^2}.$$

In this case, each component of the vector has equal weight. It is also possible to have a different weight for each dimension of the vector, where the weight is individually selected and/or learned from the actual environment, so that the distance metric results in maximal system performance.

In the following use case, a web server is connected to a database server and a lightweight directory access protocol (LDAP) server. It is not only necessary to take into account the runtime characteristics of the each of the components, but also the characteristic of the network connections to find the optimal location for the placement of a virtual machine instance. In this example, the bandwidth requirement of the connection to the LDAP server is minimal, but the latency and, potentially, the bandwidth to the database have a high influence to the overall performance. For describing this scenario, each communication link of the virtual machine instance that contains the application is assigned a requirement vector of values describing its characteristics. Each of these logical links will be instantiated on a physical network connection, which is based on a set of virtual and real network interface controllers (NICs), physical network links, and switches, with the capability vector that can match the requirement vector.

Some embodiments of the present invention continuously optimize the mapping based on: (i) the current status of the available resources; and (ii) potentially changing workload characteristics. Accordingly, continuous optimization includes: (i) retrieve the feature vector of the components (this includes compute, storage, and network resources); (ii) match the component feature vector against the resource list by computing a feature "distance/proximity" measure, which is often times based on the Euclidean distance between the two vectors (the distance allows for ranking of the affinity of the available resource to be used for a specific workload); (iii) retrieve the current load from actual resources in the system that match the selected resource type; (iv) use the sub-feature vector that reflects the identified current load; (v) apply other constraints, such as the desired collocation/anti-location (e.g. high availability) to narrow down the selection; (vi) apply cloud/system-wide objectives (such as overall power consumption) to narrow down selection; (vii) choose resources having the closest feature distance of remaining candidate selections; and/or (viii) deploy workload. Alternatively, the workload is monitored for new component features so that as new components are identified, the corresponding workloads are updated and/or created. This alternative process is used, for example, when first determining a feature vector through the workload calibration phase that is either too cumbersome, too difficult, or undesirable (such as during the original development/operations development phase).

To summarize the process flow for continuous optimization, or re-optimization, the distinct workload characteristics are defined for a given workload, usually multiple workload types are identified for a given workload. The workload requirements are captured as workload vectors, such that a resource (compute, storage, and networking) is selected based on the affinity between the capability of a given resource and the requirements on the identified workload characteristics. In some embodiments of the present invention, workload component clusters are generated such that a workload vector centroid is identified. Resources are selected, in that case, according to the particular workload vector centroid with respect to the capability(ies) of available resources. That is, the feature and workload context is extracted from the workload building block, or workload component. When an affinity between the workload requirement vector and the resource capability vector is determined, the affinity evaluation is conducted continuously.

Some embodiments of the present invention may include one, or more, of the following features, characteristics, and/or advantages: (i) decouples the "abstraction of resources" from the "real resources" and only focuses on the resources with capabilities that really matter to the desired performance of the workload; (ii) decouples the workload abstraction from the actual workload so that the matching between the workload characteristics and the capabilities of the resources is done efficiently and continuously; (iii) capability-based resource abstraction for decoupling the provisioning of heterogeneous resources from the actual workload; and/or (iv) capability-based resource abstraction eliminates the dependency on specific instruction set architecture (ISA) while focusing on the true capability differences of the resources.

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as may be being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for capability-based resource allocation in a software-defined environment, the method comprising:
    establishing a set of logical abstractions corresponding to a set of workload resources, each logical abstraction based on a particular capability of the set of workload resources;
    assigning to a first logical abstraction a capability profile identifying a first capability on which the first logical abstraction is based;
    dividing a specified workload into a set of workload components for individual assignment of logical abstractions in the set of logical abstractions to perform individual workload components in the set of workload components;
    determining a workload characteristic of a workload component; and
    allocating the first logical abstraction to the workload component based, at least in part, on the capability profile and the workload characteristic of the workload component;
    wherein:
    the workload component has a unique set of workload characteristics compared to a second workload component within the set of workload components;
    at least the allocating step is performed by computer software running on computer hardware;
    the specified workload is a print job; and
    the particular capability is a color imaging capability.

2. The method of claim 1, wherein the plurality of workload resources includes at least one of computing resources, storage resources, and networking resources.

3. The method of claim 1, wherein the plurality of workload resources includes a first workload resource in a first data center and a second workload resource in a second data center.

4. The method of claim 1, wherein the step of establishing the set of logical abstractions includes at least one of:
    discovering the set of workload resources;
    calibrating the set of workload resources; and
    clustering the set of workload resources;
    wherein:
    the discovering, calibrating, and/or clustering steps are performed automatically.

5. The method of claim 1, further comprising:
    responsive to availability of a new workload resource, determining a set of capability characteristics of the new workload resource; and
    changing the set of workload resources to include the new workload resource based, at least in part, on the set of capability characteristics of the new workload resource.

6. The method of claim 1, wherein the workload component is color photo printing.

7. A computer program product for capability-based resource allocation in a software-defined environment, the computer program product comprising a computer readable storage medium having stored thereon program instructions programmed to:
    establish a set of logical abstractions corresponding to a set of workload resources, each logical abstraction based on a particular capability of the set of workload resources;
    assign to a first logical abstraction a capability profile identifying a first capability on which the first logical abstraction is based;
    divide a specified workload into a set of workload components for individual assignment of logical abstractions in the set of logical abstractions to perform individual workload components in the set of workload components;
    determine a workload characteristic of a workload component; and
    allocate the first logical abstraction to the workload component based, at least in part, on the capability profile and the workload characteristic of the workload component;
    wherein:
    the workload component has a unique set of workload characteristics compared to a second workload component within the set of workload components;
    the specified workload is a print job; and
    the particular capability is a color imaging capability.

8. The computer program product of claim 7, wherein the plurality of workload resources includes at least one of computing resources, storage resources, and networking resources.

9. The computer program product of claim 7, wherein the plurality of workload resources includes a first workload resource in a first data center and a second workload resource in a second data center.

10. The computer program product of claim 7, wherein the program instructions programmed to establish the set of logical abstractions includes at least one of program instructions to:
    discover the set of workload resources;
    calibrate the set of workload resources; and
    cluster the set of workload resources;
    wherein the discovering, calibrating, and clustering steps are performed automatically.

11. The computer program product of claim 7, further comprising program instructions programmed to:
    responsive to availability of a new workload resource, determine a set of capability characteristics of the new workload resource; and
    change the set of workload resources to include the new workload resource based, at least in part, on the set of capability characteristics of the new workload resource.

12. The computer program product of claim 7, wherein the workload component is color photo printing.

13. A computer system for capability-based resource allocation in a software-defined environment, the computer system comprising:

a processor(s) set; and
a computer readable storage medium;
wherein:
the processor set is structured, located, connected, and/or programmed to run program instructions stored on the computer readable storage medium; and
the program instructions include program instructions programmed to:
  establish a set of logical abstractions corresponding to a set of workload resources, each logical abstraction based on a particular capability of the set of workload resources;
  assign to a first logical abstraction a capability profile identifying a first capability on which the first logical abstraction is based;
  dividing a specified workload into a set of workload components for individual assignment of logical abstractions in the set of logical abstractions to perform individual workload components in the set of workload components;
  determine a workload characteristic of a workload component; and
  allocate the first logical abstraction to the workload component based, at least in part, on the capability profile and the workload characteristic of the workload component;
wherein:
  the workload component has a unique set of workload characteristics compared to a second workload component within the set of workload components;
  the specified workload is a print job; and
  the particular capability is a color imaging capability.

14. The computer system of claim 13, wherein the plurality of workload resources includes at least one of computing resources, storage resources, and networking resources.

15. The computer system of claim 13, wherein the plurality of workload resources includes a first workload resource in a first data center and a second workload resource in a second data center.

16. The computer system of claim 13, wherein the program instructions programmed to establish the set of logical abstractions includes at least one of program instructions to:
  discover the set of workload resources;
  calibrate the set of workload resources; and
  cluster the set of workload resources;
  wherein the discovering, calibrating, and clustering steps are performed automatically.

17. The computer system of claim 13, wherein the workload component is color photo printing.

18. The computer system of claim 13, further including program instructions programmed to:
  responsive to availability of a new workload resource, determine a set of capability characteristics of the new workload resource; and
  change the set of workload resources to include the new workload resource based, at least in part, on the set of capability characteristics of the new workload resource.

* * * * *